United States Patent Office 3,487,190
Patented Dec. 30, 1969

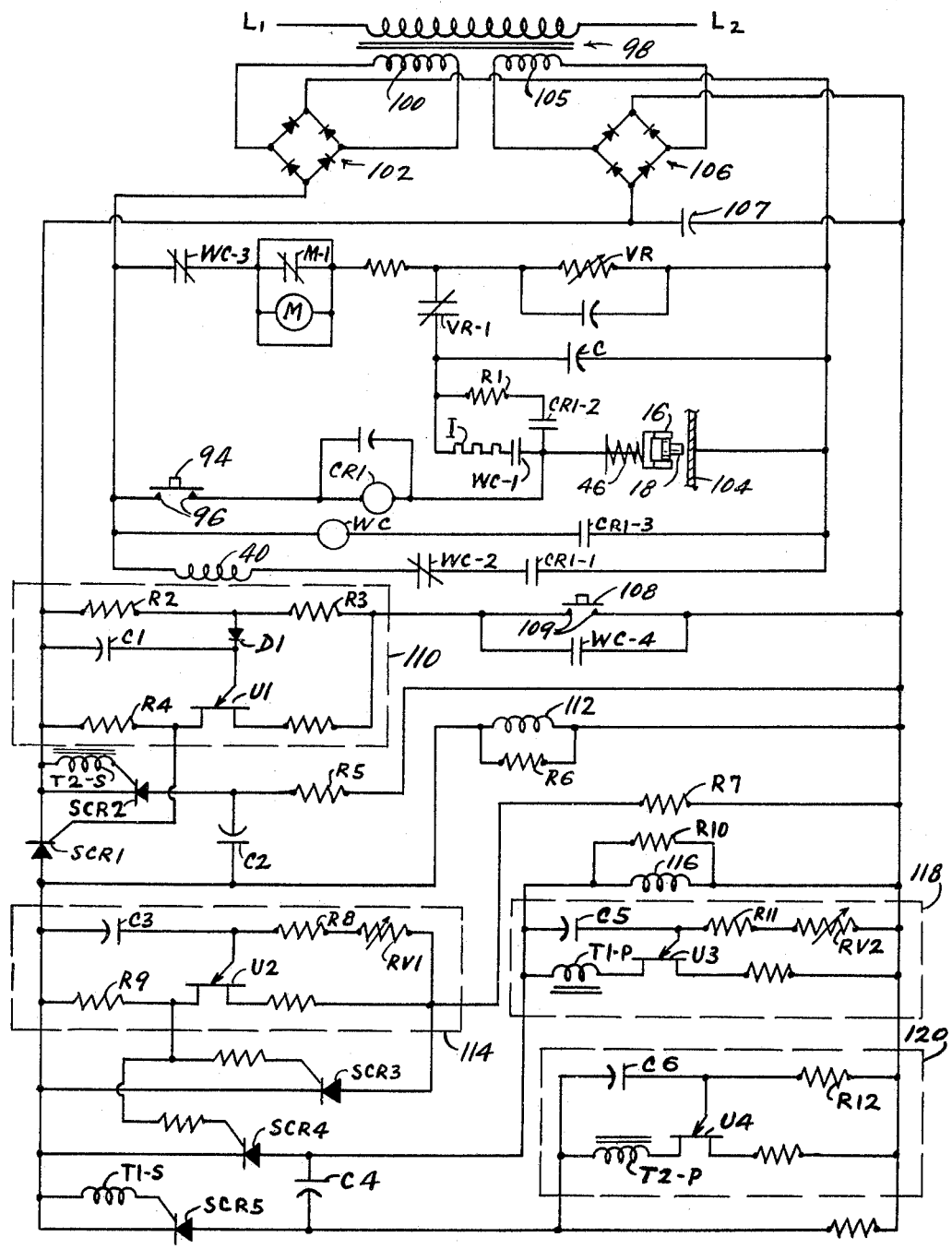
FIG-2-

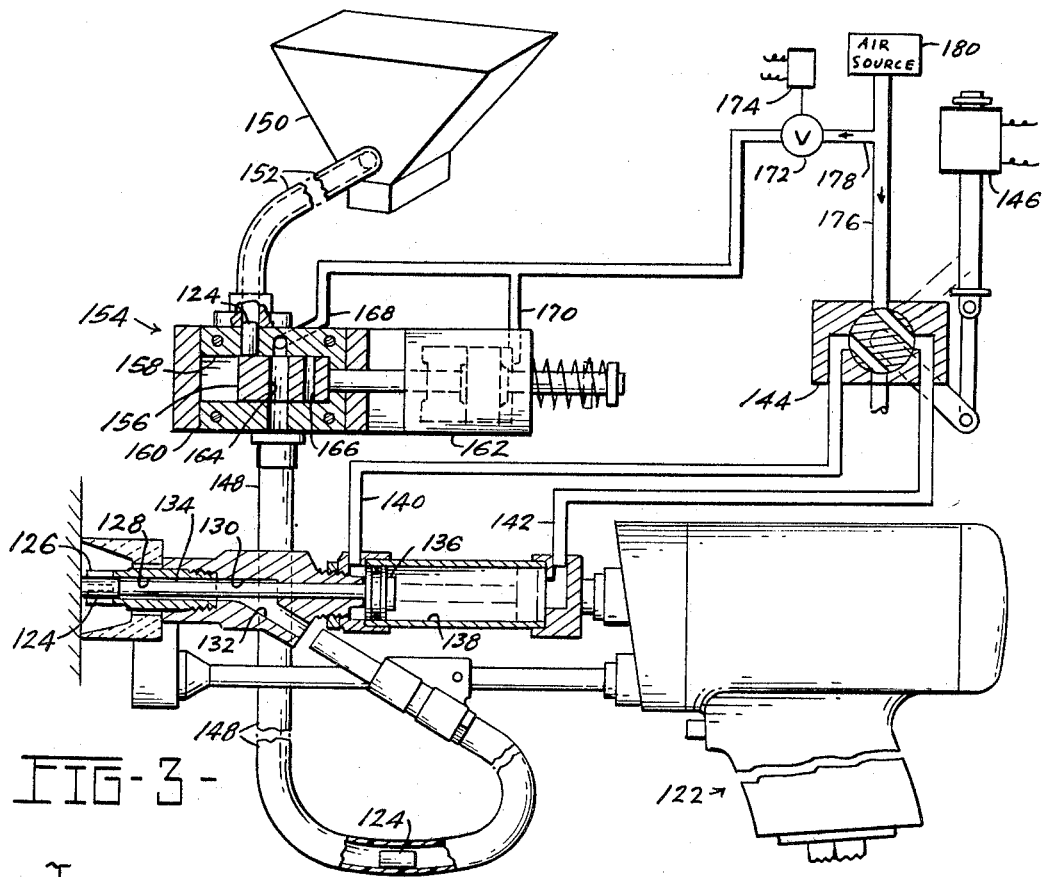
FIG-3-
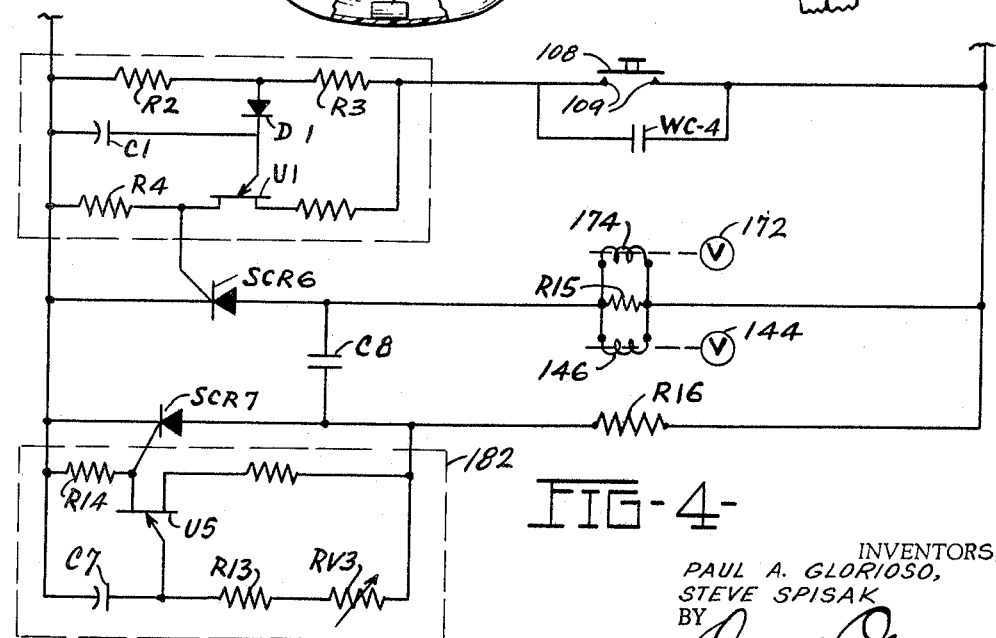
FIG-4-
INVENTORS,
PAUL A. GLORIOSO,
STEVE SPISAK
BY Owen+Owen
ATT'YS.

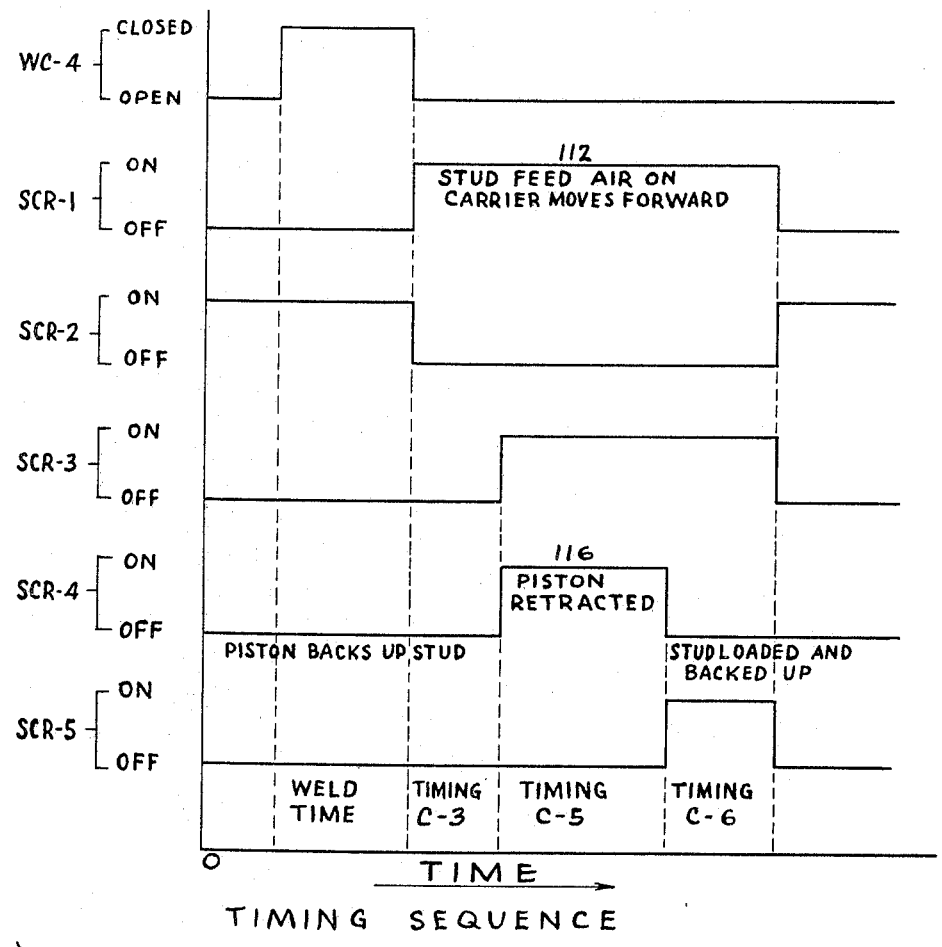
FIG-5-

3,487,190
CONTROL MEANS FOR AUTOMATICALLY LOADING STUDS IN A STUD WELDING TOOL
Paul A. Glorioso, Amherst, and Steve Spisak, Elyria, Ohio, assignors, by mesne assignments to TRW Inc., Cleveland, Ohio, a corporation of Ohio
Filed Mar. 12, 1965, Ser. No. 439,418
Int. Cl. B23k 9/20, 11/26, 11/04
U.S. Cl. 219—98      11 Claims This invention relates to means for automatically controlling the loading of studs in a stud welding tool and more specifically to means for controlling the feeding of studs to the welding tool and the bringing the studs into a welding position at the end of a tool chuck.

Stud welding tools for end welding various types of studs to workpieces are now in common use. The studs preferably are arc welded by the technique disclosed in Nelson Patent 2,191,494, for example, or in my recently issued Patent 3,131,880 entitled "Condenser Discharge Stud Welding Apparatus." The studs also can be welded by the technique disclosed in Graham Patent 2,610,278, for example, or by resistance welding.

In the overall welding operation, the time required to load the stud in the chuck may be much longer than the time required for the actual welding of the stud to the workpiece, the latter time being less than a second or two, in most instances. This is particularly true for smaller studs which may be in the order of only one-quarter inch long and which are particularly difficult to handle. Hence, a decrease in the loading time can substantially reduce the time for the overall welding operation, particularly when a large number of small studs are to be welded.

To meet this problem, the present invention relates to a loading system which includes a source of supply of studs and means for moving the studs, one at a time, into a loading passage communicating with the chuck of the welding tool. A plunger is located in the loading passage behind the chuck with the plunger serving to move a stud into the chuck and to assist in holding it in welding position during the welding operation. The plunger is powered by pneumatic or electrical means located at the forward end of the tool. This loading system has been found to be very effective in facilitating loading of studs into the welding tool and in shortening the overall time for each welding cycle.

The present invention includes improved control means for sequencing operations of the loading apparatus and for automatically initiating the loading operation at or near the end of each welding cycle. The control means includes a novel circuit for initiating the loading operation and also includes timing and sequencing circuits for controlling the loading steps automatically in proper order and at proper intervals.

It is, therefore, a principal object of the invention to provide control means for automatically controlling the loading of studs in a welding tool.

Another object of the invention is to provide simple and reliable control means for initiating the loading of studs in a stud welding tool, and for properly sequencing the loading operations.

Other objects and advantages of the invention will be apparent from the following detailed description of a preferred embodiment thereof, reference being made to the accompanying drawings, in which:

FIG. 2 is a diagrammatic view of control means including preferred circuits for initiating and operating the tool and the loading apparatus of FIG. 1;

FIG. 3 is a somewhat schematic view of a modified loading system and welding tool operated by the control means of the invention;

FIG. 4 is a diagrammatic view of a portion of control means and circuits for initiating and operating the loading apparatus of FIG. 3; and FIG. 5 is a diagram of the loading steps controlled by the circuits of FIG. 2.

Figure 1:
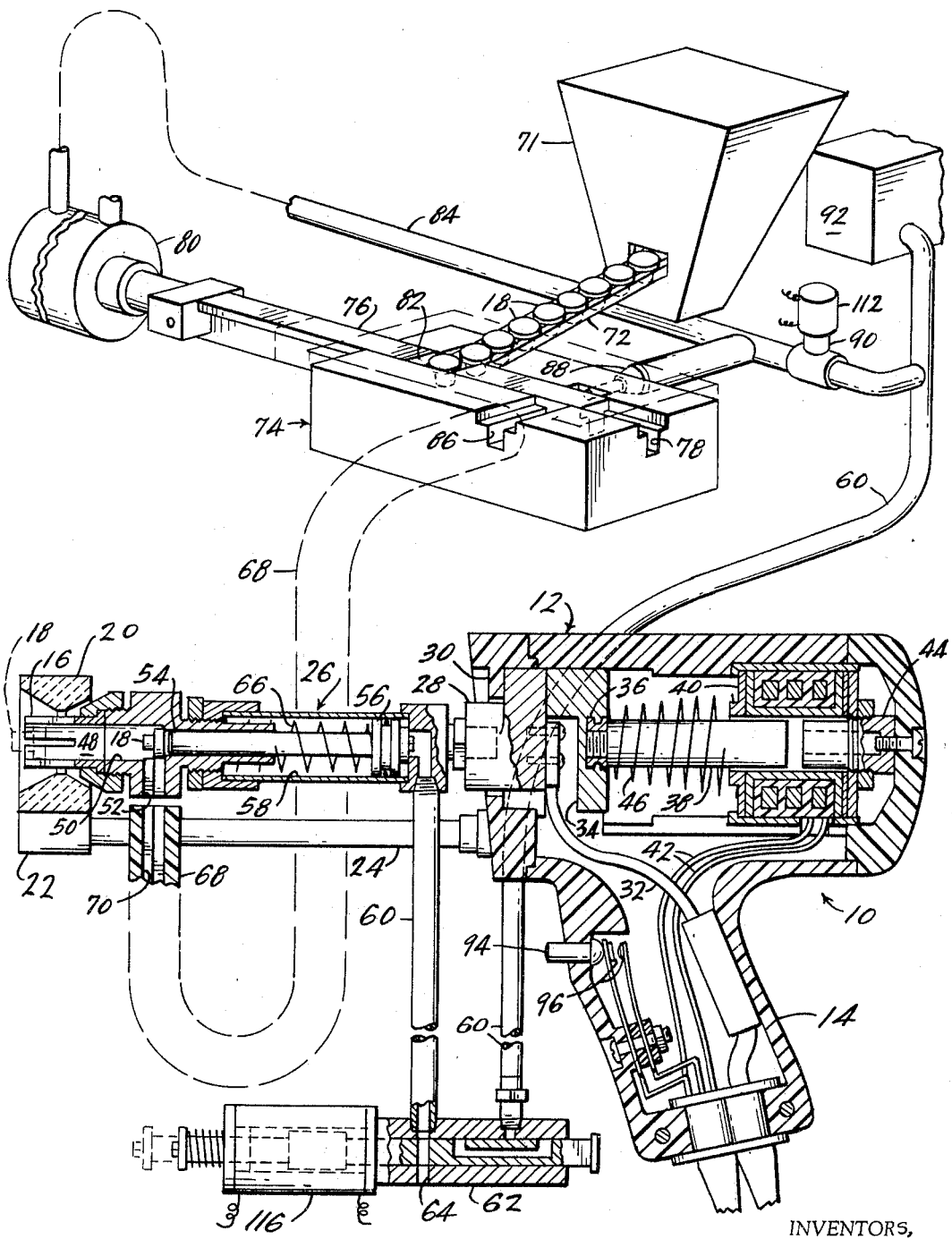
FIG. 1 is a view partly in perspective and partly in vertical cross section of a loading system and a welding tool operated by the control means of the invention.

Referring now more particularly to FIG. 1, a welding tool suitable for use with the control means of the invention is indicated at 10 and is designed for welding a stud by a drawn-arc technique. The tool is known in the art and includes means for retracting the stud from a surface or workpiece, means for holding the stud in the retracted position, and means for moving the stud toward and against the workpiece after a predetermined period. The stud welding tool 10 includes a main housing 12 of dielectric material having an integral hand grip 14. A chuck 16 is located at the front of the tool 10 and holds a stud 18, indicated in dotted lines, during the welding operation. The chuck 16 is surrounded by a suitable spark shield 20 attached to a welding foot 22 which is adjustably held by two supporting legs 24, as is well known.

The chuck 16 is attached to a chuck leg 26, to be discussed in more detail subsequently, which is connected to a cable clamp 28. The clamp 28 is slidably supported in a forward portion of the body 12 which is closed off by a front end wall 30. Welding current is supplied to the clamp 28 through a flexible main welding cable 32 which applies welding current through the chuck leg 26 to the chuck 16 and to the stud 18. Beyond the cable clamp 28 is a rear cable clamp part 34 attached by a connection 36 to a solenoid core 38 extending rearwardly into a lifting and holding coil 40. The core 38 is retracted when current is supplied to the coil 40 through suitable leads 42. The rearward movement of the core 38, which determines the extent of the lift of the chuck 16 and the stud 18, is limited by an adjustable core piece 44. A return or plunge spring 46 returns the chuck and the stud to the workpiece when the current to the coil 40 is shut off. If the length of the stud 18 to be welded varies excessively from stud to stud, it may be necessary to employ a clutch arrangement to enable constant lift to be obtained, as is known in the art.

In most welding tools heretofore known, each new stud had to be inserted into the chuck 16 by hand. This required that the stud be grasped by the operator, oriented, aligned with the chuck, and finally inserted. This was time consuming and particularly so when small studs were employed, which are hard to grasp and manipulate. The present invention eliminates this time-consuming operation by a loading apparatus which quickly loads a new stud in the chuck automatically and without any significant delay in the welding operations.

Accordingly, the chuck 16 has a loading passage 48 extending therethrough and communicating with a loading chamber 50 formed at the forward end of the chuck leg 26. The chamber 50 is shaped in a plane perpendicular to its longitudinal axis complemental to the transverse cross-sectional shape of the stud, e.g., the chamber 50 has a circular cross section in the case of a stud having a round head. The loading chamber 50 has a stud inlet opening 52 having a cross-sectional shape similar to the longitudinal cross section of the stud 18. The portion of the inlet 52 adjacent the loading chamber 50 preferably extends perpendicular to the axis of the chamber 50. Hence, when a T-shaped stud is propelled sideways from the inlet 52 into the chamber 50, the stud will be aligned with its longitudinal axis generally parallel to the axes of the chamber 50 and a stud plunger 54, ready to be pushed endwise into the chuck passage 48. When a stud has entered the chamber 50, it is moved forwardly by the plunger 54 which pushes the stud into the jaws of the chuck 16 with the stem of the stud protruding, as shown. The plunger 54 then holds the stud 18 in this position and backs it up squarely during the welding cycle.

The plunger 54 can be moved through the loading chamber 50 in a number of suitable ways, such as by electrical or pneumatic means. As shown, the plunger 54, which constitutes moving means for moving the stud into the chuck, is pneumatically driven by a piston 56, which reciprocates in an air cylinder 58. Air is supplied to the rear of the cylinder 58 through an air supply line 60 and is controlled by a valve 62 which supplies air to the cylinder 58 in the normal or inactive position and vents the cylinder to a vent 64 when operated or energized, as shown. When the cylinder 58 is vented, the piston 56 retracts to the rear position, as shown, by a return spring 66. It will be apparent that the air can be admitted to the front of the cylinder and the spring 66 located on the opposite side of the piston 56, in which case the normal and energized positions of the valve 62 would be reversed.

The studs 18 are fed one at a time along a predetermined path to the loading chamber 50 by suitable feed means. In this instance, a flexible feed tube 68 has a feed passage 70 providing a path for movement of the studs, the cross-sectional shape of the passage being similar to the cross-sectional shape of the studs 18. The studs to be fed through the tube 68 can be supplied from a hopper 71 and fed down an inclined track 72 to an escapement mechanism indicated at 74. The escapement 74 includes a carrier 76 slidably reciprocated in a track or slot 78 by a fluid-operated ram 80. The carrier 76 has a notch 82 which receives one stud at a time from the track 72 when in one extreme position. When the ram 80 receives air through a line 84, the carrier is moved to the other extreme position in which the notch 82 and the stud therein are in a predetermined location aligned with a supply groove 86. When the air is shut off, the carrier 76 returns to the first position, biased by a spring, for example, where it receives another one of the studs 18. The studs can be removed from the carrier 76 by pneumatic force, if desired. Thus, when air is supplied to the ram 80, the air also is supplied to a feed nozzle 88 which blows the stud in the notch 82 down the groove 86 and through the tube 68. This air can be controlled by a solenoid-operated valve 90 with the air for the feeding means as well as the stud-moving means or plunger 54 being supplied from a suitable source 92.

The operation of the stud welding tool and loading apparatus will be discussed in connection with the circuit of FIG. 2, which includes electrical means for operating the welding tool 10 as well as control means for operating the loading apparatus.

In the operation of the tool 10, the stud is first pressed against the workpiece to place it in good metal-to-metal contact therewith and to retract the chuck 16 slightly as the spark shield 20 moves against the workpiece. A trigger 94 of the welding tool then is pressed to close contacts 96. This completes an electrical path or circuit from a power source represented by a transformer 98, including a first secondary winding 100, and a full-wave rectifier 102, to a control relay CR1 when the stud 18 is in contact with the workpiece 104. No power will flow through relay CR1, however, until the stud 18 is in good electrical contact with the workpiece 104, since the stud-work contact is in series with the relay CR1.

When the relay CR1 is energized, it closes first normally-open contacts CR1–1 to supply power to the lifting coil 40 and initiate retraction of the stud 18. At the same time, normally-open contacts CR1–2 are closed to establish a pilot arc across the stud 18 and the workpiece through a resistance R1 from an energy source represented by a main capacitor C. Third, the control relay CR1 closes normally-open contacts CR1–3 to supply power to a main welding contactor WC.

The welding contactor WC closes its contacts WC–1 in the main welding circuit to connect the capacitor C with the stud and workpiece through an impedance I, and enable the capacitor to discharge fully across the stud and workpiece to establish the main welding arc following the onset of the previously-established pilot arc. The contactor WC moves relatively slowly so that the stud usually has reached its fully retracted position for a period by the time the main welding arc is struck. The welding contactor WC also opens its normally-closed contacts WC–2 to de-energize the lifting coil 40 and cause the stud to begin its plunge stroke under the closing force of the spring 46. The opening of the contacts WC–2 and the closing of the contacts WC–1 are timed so that the stud will contact the workpiece before the pools of metal melted by the main welding arc can solidify. The welding contactor also opens normally-closed contacts WC–3 to isolate the welding circuit from the power source during the discharge of the capacitor C.

After the completion of the weld, the capacitor C is again charged to a predetermined voltage by suitable means. As shown, the voltage control includes a voltage sensitive relay VR which senses the voltage across capacitor C. The relay VR opens its contacts VR–1 when a predetermined voltage is reached to limit the charging of the capacitor C. Periodically, the circuit for the relay VR is broken by contacts M–1 operated through a motor M to enable the relay VR to again sense the voltage across the capacitor C. This is discussed more fully in the aforementioned Glorioso Patent 3,136,880.

The control means for the loading apparatus for the tool 10 are shown primarily below the representation of the circuit containing the lifting coil 40 and contacts WC–2 and CR1–1. The control means has a separate power source including a secondary winding 105 on the transformer 98, a second full-wave rectifier 106, and a filter capacitor 107. The first loading operation and any subsequent ones desired can be initiated manually by a trigger 108 controlling contacts 109. After the first loading operation, the remaining loading operations will be automatic and the only other time the manual button 108 is required is in the event of malfunctioning of a loading cycle because of jamming of a stud or depletion of the stud supply, for example, thus requiring more than one loading operation between welds. Otherwise, the loading operation of the tool 10 is automatically initiated by operation of normally-open contacts WC–4 in parallel with the manual contacts 109. The contacts WC–4 close when the weld contactor WC is actuated and are then opened when the contactor WC is de-energized after the end of the weld, when the tool is pulled from the welded stud to de-energize the relay CR1. It is also possible, however, to initiate the loading operation at the end or just prior to the end of a weld cycle by using other devices or other sequences of the welding contactor to cause the contacts 109 or WC–4 to close and open earlier.

Referring to FIG. 2 and the timing diagram of FIG. 5, when either of the contacts 109 or WC–4 are closed and then opened, the loading operation begins. This is accomplished by an initiating circuit 110 enclosed in dotted lines in FIG. 2. When either set of contacts is closed, a condenser C1 is charged to a value determined by voltage divider resistances R2 and R3. After the condenser C1 is charged, it is prevented from discharging across the resistance R2 by a diode D1. The charge on the condenser C1 is less than the intrinsic stand-off ratio for a first unijunction transistor U1. However, when the contacts 109 or WC–4 again open, the interbase voltage of the unijunction transistor U1 drops to zero, with the result that the firing voltage is exceeded while the charge on the condenser C1 remains the same, and the condenser C1 discharges through the transistor U1 and a resistance R4. This discharge develops a voltage across R4 which is applied to a gate of a first silicon controlled rectifier SCR1 which then fires and remains conducting until its current drops to or goes below zero or its anode-cathode voltage reverses.

A second silicon controlled rectifier SCR2 is connected across the terminals of the full-wave rectifier 106 through a resistance R5 and is controlled by a secondary T2–S of a pulse-transformer having a primary T2–P. As described subsequently, the rectifier SCR2 has already been turned on by a pulse developed in the primary T2–P and the secondary T2–S. With the rectifier SCR2 conducting, a condensor or capacitor C2 connected across the full-wave rectifier 106 is charged through a resistance R6 and a solenoid 112. The plate of the capacitor C2 connected to the anode of the rectifier SCR2 becomes charged negatively.

When the silicon controlled rectifier SCR1 is fired, the condenser C2 is discharged back through the rectifier SCR1, thereby placing the charged condenser C2 across the rectifier SCR2 which causes the rectifier to turn off. The condenser C2 then recharges to the opposite polarity through the rectifier SCR1 and through the resistance R5. The condenser C2 remains so charged in the opposite direction until the rectifier SCR2 is keyed again.

With the rectifier SCR1 conducting, the solenoid 112 is energized to open the valve 90. This supplies air to the ram 80 to move the carrier 76 from its left hand position, as viewed in FIG. 1, to its right hand position, thereby carrying a stud in the notch 82 into alignment with the air nozzle 88. The stud in the notch 82 is received from the inclined track 72 under the force of gravity. By the time the notch 82 is aligned with the nozzle 88, air also is supplied to the nozzle 88 by the valve 90 and blows the stud through the slot 86, through the path established by the tube 68, and into inlet 52 adjacent the loading chamber 50. The resistance R6 located across the solenoid 112 provides a direct current load for the rectifier SCR1 which otherwise would shut off when the solenoid 112 is energized, due to its inductance. It also protects the rectifier SCR1 when the solenoid 112 is de-energized.

The rectifier SCR1 also connects the filtered direct current source with a resistance R7 and a first timing network or circuit 114 enclosed in dotted lines. A condenser or capacitor C3 is charged at a rate determined by a fixed resistance R8 and a variable resistance RV1 until, after a time delay determined by the charging rate, the condenser C3 fires a second unijunction transistor U2. The condenser C3 then discharges across a resistance R9 and fires a third silicon controlled rectifier SCR3 which shunts the timing network 114. This prevents capacitor C3 from recharging and thus prevents the timing network 114 from timing again after discharge of the condenser C3.

A fourth silicon controlled rectifier SCR4 is also keyed by the discharge of the condenser C3 at the same time as the rectifier SCR3. Keying of the rectifier SCR4 causes a solenoid 116 of the valve 62 to be energized and to retract the plunger 54 back of the inlet 52. The stud 18, which is located at the inlet 52 and is urged against the plunger 54 by the air of the nozzle 88, then drops into the chamber 50, ready for loading into the chuck 16. This arrangement is preferred to blowing the stud directly into the chamber 50 after the plunger 54 has been retracted because it reduces the chance of the stud bouncing and becoming cocked in the chamber 50. When the stud is already in the inlet 52, it has but a short distance to move after the plunger 54 is retracted. A resistance R10 is connected across the coil 116 and serves the same protective purpose as the resistance R6.

It will be seen from the above that the energization of the valve 62 takes place a predetermined period after energization of the valve 90, as determined by the resistance R8 and the variable resistance RV1. Hence, the plunger 54 is retracted a predetermined period after the stud is blown down the tube 68

A second timing network or circuit 118 is energized by the rectifier SCR4 at the same time that the solenoid 116 is energized. This second timing network determines the length of time that the valve 62 is energized, and, therefore, the length of time that the piston is retracted. With the rectifier SCR4 keyed, a condenser C4 is charged with a negative polarity on the condenser plate connected to the anode of the rectifier SCR4. Also, when the rectifier SCR4 is keyed, a condenser C5 is charged at a rate determined by a fixed resistance R11 and a second variable resistance RV2. After a predetermined time delay, the condenser C5 becomes charged to a predetermined value, firing a third unijunction transistor U3 and discharging through a primary winding T1–P of a first pulse transformer. The primary pulses a secondary T1–S and fires a fifth silicon controlled rectifier SCR5. This causes the charged condenser C4, functioning similarly to the condenser C2, to discharge through the rectifier SCR5 and connects the condenser C4 across the silicon controlled rectifier SCR4. The polarity of the charge on the condenser C4 is such as to turn off rectifier SCR4, thereby de-energizing the solenoid 116 and the valve 62. The stud plunger 54 then moves forwardly again.

A third timing network 120 is placed in operation by the firing of rectifier SCR5. A condenser C6 is charged at a fixed rate as determined by a fixed resistance R12. After a predetermined period, the condenser C6 fires a fourth unijunction transistor U4 and discharged through a primary T2–P of a second pulse transformer. The secondary T2–S of this pulse transformer keys the second silicon controlled rectifier SCR2. This connects condenser C2 across the rectifier SCR1, the polarity of the charge on the condenser C2 being such as to turn off rectifier SCR1. The condenser C2 is simultaneously discharged through SCR2 upon firing of the same. Turning off the rectifier SCR1 de-energizes the solenoid 112, thereby shutting off the air to the nozzle 88 and to the ram 80. The carrier 76 then retracts to its initial position to receive another one of the studs in the notch 82. The condenser C2 then charges to its initial polarity due to its connection across the full-wave rectifier 106 through the rectifier SCR2 and the solenoid 112 in parallel with the resistor R6, the plate of condenser C2 connected to the anode of the rectifier SCR2 being charged negatively. Turning off the rectifier SCR1 also turns off the rectifiers SCR3 and SCR5 to restore the circuit to its initial condition such that it is ready for a subsequent loading cycle.

It will be seen that the third timing network 120 thereby provides a slight delay between the forward movement of the plunger 54 and the termination of the air supply to the nozzle 88. This need only be long enough to assure that the plunger 54 passes the inlet 52 so that the stud 18 will be held in by the air from the nozzle 88 and will not accidentally bounce or otherwise move out of the chamber 50 back to the inlet 52 before it can be pushed to the chuck 16 by the plunger 54.

While the sequence of the loading operations can be varied to some extent, the above-described one being preferred, it is essential that the plunger 54 remain in the retracted position until the stud is in the loading chamber. It is also preferred that the plunger not retract until after the stud has been air propelled via the tube 68 into contact with the plunger, and also that the air or feeding means be on until the plunger has moved forwardly beyond the inlet of the loading chamber. The loading cycle is initiated near the end of a weld cycle, preferably after the weld cycle ends and the welded stud is separated from the chuck. Since another welding cycle cannot be initiated until a stud is in contact with the workpiece 104, in order to energize the control relay CR1, it is impossible to initiate another welding cycle until the previous loading operation is completed.

Referring more particularly to FIG. 3, which is not to scale, a welding tool 122 is generally similar to the tool 10 and the internal components thereof will not be discussed in detail. The tool 122 also can include a clutch to accommodate slight variations in the lengths of the studs to be welded and also can include means for dampening the plunge of the stud during the return stroke, as is now known in the art.

Rather than the headed studs 18, the tool 122 is designed to use headless studs 124, the length of which substantially exceeds the diameter so that the problem of cocking of the studs in a modified chuck 126 is substantially reduced. The studs 124, for example, have a diameter of ¼ inch and a length from ⅜ to 1 inch, and can be plain or threaded, depending upon the application. Such studs have found wide use in a variety of commercial applications where the number of studs to be welded per unit of time is less than that of the headed studs 18, but when the quantity is still sufficient that hand loading is impractical.

To automatically load such studs, the chuck 126 has a central passage 128 connected to a loading chamber 130 which, in this instance, has a rearwardly slanted inlet 132 which receives the studs longitudinally or endwise, rather than transversely or sideways, as is true of the inlet 52. When one of the studs enters the chamber 130, it is moved forwardly to the welding position in the chuck 126 by means of a stud plunger 134 which pushes the stud into the jaws of the chuck with an end thereof protruding, as before. In this instance, however, the plunger 134 is pneumatically driven by a two-way piston 136 which reciprocates in an air cylinder 138. Air is supplied to both ends of the cylinder 138 through lines 140 and 142 which are connected to a commercially available four-way valve 144 operated by a solenoid 146. When the valve 144 supplies air to one end of the cylinder 138, the valve vents the other end automatically.

The studs 124 are fed one at a time along a predetermined path to the loading chamber 130 through a flexible feed tube 148. The studs fed to the tube 148 can be supplied from a hopper 150 similar to the hopper 71 and fed down a supply tube 152 to an escapement mechanism 154. In this instance, the escapement 154 includes a carrier 156 slidably reciprocated in a chamber 158 of a housing 160 by a fluid-operated ram 162. The carrier 156 has two passages 164 and 166, in this instance, the first of which receives the studs 124, one at a time, from the tube 152 and transfers them to the flexible tube 148. When the passage 164 is aligned with the tube 148, the stud drops down into the tube by gravity until it reaches a low point therein, at which time it comes to rest. The stud subsequently is blown from this rest position into the chamber 130 when air is supplied through a branch line 168 and through the second passage 166 of the carrier.

When the ram 162 receives air from a second branch line 170, the carrier 156 is moved to the outer extreme position in which the passage 164 receives one of the studs 124 from the tube 152 and the passage 166 is aligned with the line 168 to enable air to be blown through the tube 148. When air to the line 170 is shut off, a spring returns the piston to the first position and the carrier 156 is similarly moved with the passage 164 then aligned with the tube 148 to enable the stud carried by the passage 164 to drop into the tube. The air for the branch lines 168 and 170 is controlled by a valve 172 operated by a solenoid 174. Air for the valves 144 and 172 is supplied through main line 176 and 178 from a source designated 180.

The operation of the apparatus of FIG. 3 will now be discussed in connection with the circuit of FIG. 4, which does not show the welding circuit of FIG. 2 since it can be identical thereto, the specific welding circuit not constituting part of the invention. The circuit of FIG. 4 also can be supplied with power from the secondary winding 105 and the second full-wave rectifier 106, along with the filter capacitor 107, so that this part of the circuit also is eliminated in FIG. 4.

Circuitry for initiating the loading operation is similar to that of FIG. 2, including the trigger contacts 109 and the welding contacts WC–4 along with the unijunction transistor U1 circuit. When the contacts 109 or WC–4 close and then subsequently open, the unijunction transistor U1 is keyed and the capacitor C1 discharges through the transistor U1 and the resistance R4. This keys or fires a silicon controlled rectifier SCR6 to begin the loading cycle. Before the first welding operation, another silicon controlled rectifier SCR7 initially is off or open with the result that, as soon as the power is turned on, and before the rectifier SCR6 is keyed, voltage is applied across a fourth timing circuit 182 so that a capacitor C7 is charged at a rate determined by a fixed resistance R13 and a variable resistance RV3. When the charge on the capacitor C7 reaches a predetermined value, it fires or keys a fifth unijunction transistor U5 which causes the capacitor C3 to discharge across a resistance R14 to fire the silicon controlled rectifier SCR7. At the same time, a capacitor C8 is charged through a resistance R15 and the rectifier SCR7. When the latter is keyed. When the rectifier SCR6 is then turned on, the capacitor C8 is discharged across it to place an opposite charge on the rectifier SCR7 and turn it off, so that the rectifier SCR7 is turned off whenever the rectifier SCR6 is turned on, and vice versa.

Under these conditions, when the rectifier SCR6 is fired by the initiating circuit, it energizes the valve solenoids 146 and 174 to cause the ram piston to move forwardly and thereby cause the passage 164 and the carrier 156 to receive a stud from the tube 152 and at the same time align the passage 166 with the branch line 168. Air is simultaneously supplied through the line 168 to blow a stud in the flexible tube 148 to the chamber 130. At the same time, the four-way valve 144 causes air to be supplied to the forward end of the cylinder 138 to retract the piston 136 to enable the stud to enter the chamber 130. Since the studs 124 are headless and have a length substantially in excess of their diameter, there is no problem of their cocking in the chamber 130 or the chuck passage 128 so that it is no longer necessary to time the plunger 134 in a manner to delay retraction until the stud reaches it. Consequently, all of the operations can take place at once, instead of being individually timed.

While the rectifier SCR6 energizes the valve solenoids, it also causes the capacitor C8 to be charged, with the opposite polarity, through the rectifier SCR6 and a resistance R16. Because the rectifier SCR7 again is off, the capacitor C7 again charges at a predetermined rate until, after a predetermined time delay, the charge is sufficient to fire the unijunction transistor U5. When this occurs, the rectifier SCR7 again is turned on to cause the capacitor C8 to place an opposite charge on the rectifier SCR6 to turn it off and de-energize the valve solenoids 146 and 174. Hence, the timing circuit 182 controls the length of time the air is on to control the time the carrier 156 is in the outer or left-hand position, the time the air is blown through the tube 148, and the time the plunger 134 is in the retracted position. The rectifier SCR7 remains keyed until the rectifier SCR6 again is fired or until the power source is turned off.

Various modifications of the above described embodiments of the invention will be suggested to those skilled in the art, and it is to be understood that such modifications can be made without departing from the scope of the invention as defined in the appended claims.

We claim:
1. Control means for initiating and sequencing operations of loading apparatus for loading studs in a welding tool chuck, said loading apparatus including means for orienting a stud and for placing it at a predetermined location, means forming a loading chamber carried by the welding tool and communicating with said chuck, means for feeding studs from the location along a path to said loading chamber, said loading chamber having an inlet aligned with the path, and means for moving studs from the loading chamber into said chuck, said control means comprising means for initiating operation of said orienting means and said feeding means at a predetermined time relative to the welding cycle, and time delay means for operating said moving means to retract said moving means a period of time after said initiating means is actuated, the period of time being sufficient to enable said feeding means to feed studs to a position at the inlet adjacent said loading chamber from the location.

2. Control means for initiating and sequencing operations of loading apparatus for loading studs in a welding tool chuck, said loading apparatus including means for placing a stud at a predetermined location, means forming a loading chamber carried by the welding tool and communicating with said chuck, means for feeding studs along a path to said loading chamber, and means for moving studs from the loading chamber into said chuck, said control means comprising means for initiating operation of said placing means and said feeding means, at a predetermined time relative to a welding cycle to feed a stud to a position adjacent said loading chamber and in contact with said moving means, means for retracting said moving means from said loading chamber after the stud has moved into contact with said moving means and means for moving said moving means into said loading chamber, and toward said chuck after the stud has been moved by said feeding means from the position adjacent said loading chamber into said loading chamber.

3. Control means for initiating and sequencing operation of loading apparatus for loading studs in a welding tool chuck, said loading apparatus including means for placing a stud in a predetermined location, means forming a loading chamber communicating with said chuck, means for feeding the stud from said location to said loading chamber and means for moving the stud from the loading chamber into said chuck, said control means comprising means for operating said feed means, time delay means responsive to said feed-operating means for operating said moving means to retract said moving means from the chuck after a predetermined period of time sufficient to enable said feed means to move the stud into contact with said moving means, means responsive to said moving means operating means for causing said moving means operating means to move said moving means back to the chuck after a predetermined period of time sufficient to enable said feed means to move the stud into said loading chamber from the position adjacent said loading chamber, and means responsive to said last-named means for terminating operation of said feed means after a predetermined period of time sufficient to enable said moving means to begin to move toward the chuck.

4. Control means for sequencing operations of loading apparatus for loading studs in a welding tool chuck, said loading apparatus including means forming a loading chamber positioned behind and communicating with said chuck, said loading chamber having an inlet, means for feeding studs along a path from a remote point to said loading chamber, and means for moving studs from the loading chamber into said chuck, the control means comprising a unidirectional power supply, a first actuating circuit connected in circuit with said power supply including first solenoid means for operating said feeding means and a first semiconductor controlled rectifier in series circuit with said solenoid means, a second actuating circuit connected in circuit with said power supply, said second actuating circuit including second solenoid means to retract said moving means beyond said chamber inlet and a second semiconductor controlled rectifier in series therewith, an initiating circuit connected in circuit with said power supply including first switching means operably connected to render said first semiconductor controlled rectifier conductive thereby to actuate said first solenoid means, a timing circuit connected in circuit with said power supply, said timing circuit including second switching means operably connected to respond to conduction of said first semiconductor controlled rectifier to render said second semiconductor controlled rectifier conductive and thereby actuate said second solenoid means, and time delay circuit means connected to said second switching means for delaying the action thereof on said second semiconductor controlled rectifier for a predetermined time until a stud fed by said feeding means has reached the inlet of said loading chamber.

5. Control means for initiating and sequencing operation of loading apparatus for loading studs in a welding tool chuck, said loading apparatus including means for placing a stud in a predetermined location, means forming a loading chamber communicating with said chuck, means for feeding the stud from said location to said loading chamber, and means for moving the stud from the loading chamber into said chuck, said control means comprising switch means for closing and opening a circuit, a first semiconductor controlled rectifier, means in said circuit responsive to the combination of both the closing and the opening thereof for keying said first semiconductor controlled rectifier, said responsive means including voltage divider means, a first condenser chargeable to a predetermined value as determined by said voltage divider means, a first unijunction transistor having a interbase voltage of zero when said circuit is open, said first condenser discharging through said first unijunction transistor when said first condenser is charged and the interbase voltage is substantially zero, the discharge of said first condenser keying said first semiconductor controlled rectifier, means responsive to the keying of said first semiconductor controlled rectifier for operating said feeding means and said moving means.

6. In apparatus for welding studs to a workpiece, said apparatus including a chuck having a jaw end and an inlet to the rear thereof, a stud plunger having a retracted position behind said inlet and an extended position near the jaw end of the chuck, said plunger being effective to back-up a stud in the chuck during a welding operation when in the extendled position, a cylinder located behind said chuck, a fluid-operated piston in said cylinder connected with said stud plunger, a stud supply tube communicating with said chuck inlet when said chuck is in a predetermined position, means for supplying studs one at a time to said supply tube, means including a feed valve for blowing air into said supply tube to transport a stud to said chuck when said valve is open, fluid supply means for supplying fluid to said cylinder and including a cylinder valve effective to control flow of fluid to said cylinder to enable said fluid-operated piston to move said stud plunger to the extended position when said cylinder valve is in a first position and to enable said fluid-operated piston to move said stud plunger to the retracted position when said cylinder valve is in a second position, the improvement comprising means for opening said feed valve to feed a stud to said chuck inlet and in contact with said stud plunger when said stud plunger is in its extended position, means for moving said cylinder valve to the second position to cause said stud plunger to retract a period of time after said feed valve is opened and the stud is in contact with said stud plunger, means for subsequently moving said cylinder valve to the first position to move said stud plunger from the retracted position to the extended position after the stud has been moved through said chuck inlet, and means for moving said feed valve to the closed position a period of the time after said cylinder valve is moved back to its first position and after said stud plunger has at least partially blocked said inlet when moving the stud toward said jaw end of said chuck.

7. Control means according to claim 1 characterized by means for terminating the operation of said moving means to move said moving means toward the chuck after the initiation of the operation of said moving means, and means for terminating the operation of said feeding means after said moving means has begun to move toward said chuck.

8. Control means according to claim 2 characterized by means delaying operation of the moving means for moving the stud toward the chuck for a period of time after said retracting means retracts said moving means from said loading chamber.

9. A circuit according to claim 4 characterized by said first actuating circuit including an additional semiconductor controlled rectifier in parallel circuit with said first semiconductor controlled rectifier and capacitance means interconnecting said first and second semiconductor controlled rectifiers for rendering the same non-conducting in alternate sequence.

10. Control means for controlling loading of weldable studs in a welding tool by feeding the studs through a feed valve controlled supply tube to a loading chamber and by moving the studs to a chuck of the tool by a stud plunger operated by a cylinder valve, said control means comprising means to actuate the feed valve to feed a stud through said supply tube to said loading chamber, first timing circuit means initiated by operation of said feed valve actuating means, said first timing circuit means actuating said cylinder valve after a predetermined period to retract the stud plunger from the loading chamber after the stud is in contact with said plunger adjacent said loading chamber, second timing circuit means operated in response to said first timing circuit means and effective to cause said plunger to re-enter said chamber and to move the stud into the chuck after moving into the loading chamber, and third timing circuit means responsive to the operation of said second timing circuit means to close said feed valve and to render said first timing circuit means ready for another sequence after a predetermined period of time sufficient to enable the stud to be contacted by said plunger when moving the stud toward said chuck.

11. Control means for initiating and sequencing the operation of loading apparatus for loading studs in a welding tool chuck, said loading apparatus including means for placing a stud in a predetermined location, means forming a loading chamber communicating with said chuck, means for feeding the stud from said location to said loading chamber, and plunger means for moving the stud from said loading chamber into said chuck, said control means comprising a first timing network, means operated in response to a portion of a welding cycle for operating said first timing network and for operating said feeding means, means responsive to said first timing network to operate said plunger means after a predetermined period of time to retract said plunger means from said chuck after the stud has been moved to a position adjacent said loading chamber and has contacted said plunger means, and for then returning said plunger means toward said chuck after the stud has been moved into said loading chamber, and additional timing network, and means responsive to said additional timing network to terminate operation of said feed means after the stud is moved toward said chuck.

References Cited

UNITED STATES PATENTS

| | | | |
|---|---|---|---|
| 2,991,348 | 7/1961 | Klees | 219—114 |
| 3,100,833 | 8/1963 | Ritter et al. | 219—98 |

JOSEPH V. TRUHE, Primary Examiner

R. F. STAUBLY, Assistant Examiner

U.S. Cl. X.R.

219—103, 113